(12) United States Patent
Snow

(10) Patent No.: US 8,531,487 B2
(45) Date of Patent: Sep. 10, 2013

(54) SOFTWARE FOR DISPLAYS WITH DIFFERENT PIXEL DENSITIES

(75) Inventor: Mathew Snow, San Rafael, CA (US)

(73) Assignee: Adobe Systems Incorporated, San Jose, CA (US)

(*) Notice: Subject to any disclaimer, the term of this patent is extended or adjusted under 35 U.S.C. 154(b) by 398 days.

(21) Appl. No.: 12/862,341

(22) Filed: Aug. 24, 2010

(65) Prior Publication Data

US 2013/0194289 A1    Aug. 1, 2013

(51) Int. Cl.
*G09G 5/00*    (2006.01)
(52) U.S. Cl.
USPC .......................................................... 345/660
(58) Field of Classification Search
USPC .......................................................... 345/660
See application file for complete search history.

(56) References Cited

U.S. PATENT DOCUMENTS

| 4,711,544 | A | * | 12/1987 | Iino et al. | 353/14 |
| 6,262,763 | B1 | * | 7/2001 | Totsuka et al. | 348/135 |
| 7,545,386 | B2 | * | 6/2009 | Marsyla et al. | 345/600 |
| 2002/0140626 | A1 | * | 10/2002 | Chang | 345/1.1 |
| 2006/0174217 | A1 | * | 8/2006 | Yan et al. | 715/866 |
| 2009/0172531 | A1 | * | 7/2009 | Chen et al. | 715/702 |

* cited by examiner

*Primary Examiner* — Ryan R Yang
(74) *Attorney, Agent, or Firm* — Kilpatrick Townsend & Stockton LLP

(57) ABSTRACT

According to embodiments, a computer-implemented method for designing software for use on multiple devices having different display resolutions comprises determining with a computing device a display characteristic of a first display device, determining with a computing device a display characteristic of a second display device, wherein the computing device has stored in a non-transitory memory a display characteristic of one or more second display devices, calculating with a computing device a display ratio based on the display characteristic of the first display device and the display characteristic of the second display device, and rendering on the first display device a scaled display of the second display device based on the display ratio.

22 Claims, 6 Drawing Sheets

SOFTWARE FOR DISPLAYS WITH DIFFERENT PIXEL DENSITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The display resolution of a digital display device, for example a liquid crystal display ("LCD"), a plasma display panel ("PDP"), digital light processing ("DLP") projector, or related technologies, is the number of distinct pixels in each dimension that can be displayed. In other words, the display resolution is the physical number of columns and rows of pixels creating the display. The term "display resolution" can be misleading though, as it generally means pixel dimensions, i.e., the number of pixels in each dimension, which does not reflect the resolution of the display on which the image is actually formed. This resolution is properly referred to as the pixel density.

The pixel density, or the pixels per inch ("PPI") measurement, of a display device is a function of the size of the display device and the total number of pixels in the horizontal and vertical directions of the display device (i.e., the display resolution). Thus, a display designed to be rendered on a first display device having a first pixel density may have a different size if rendered on a second display device having a second pixel density.

Designers who design software for mobile devices, or other resource constrained devices, for example smartphones (e.g., APPLE® IPHONE®, GOOGLE® NEXUS ONE or other GOOGLE® ANDROID® based phones, etc.) or tablets (e.g., APPLE® IPAD®, AMAZON® KINDLE®, etc.), generally design the software on conventional computers, for example personal computers ("PCs") or APPLE® computers. Designers often use design software to emulate mobile devices on conventional computers to test software designed for mobile devices. This allows the designer to see and interact with an emulated preview reflecting how the software would appear and behave on a specific mobile device.

However, because the pixel density of the display device on which the emulated mobile device is rendered may differ from the pixel density of the emulated mobile device, the emulated mobile device may not be shown having its actual physical size. This presents difficulties to designers, for example user interface controls may appear sufficiently spaced on the emulated mobile device, but when the software is run on the actual mobile device the spacing may be unacceptable. Additionally, while design programs may include zoom controls that may be adjusted by a designer, such adjustment may be time consuming and still may not ensure that the emulated mobile device is rendered having its actual physical size.

SUMMARY

According to embodiments, a computer-implemented method for designing software for use on multiple devices having different display resolutions comprises determining with a computing device a display characteristic of a first display device, determining with a computing device a display characteristic of a second display device, wherein the computing device has stored in a non-transitory memory a display characteristic of one or more second display devices, calculating with a computing device a display ratio based on the display characteristic of the first display device and the display characteristic of the second display device, and rendering on the first display device a scaled display of the second display device based on the display ratio.

According to embodiments, computer-readable instructions are stored on a non-transitory storage device, the computer-readable instructions are configured to be processed by a processor to cause the processor to perform a method comprising determining with a computing device a pixel density measurement of a first display device, determining with a computing device a pixel density measurement of a second display device, wherein the computing device has stored in a non-transitory memory one or more pixel density measurements corresponding to one or more second display devices, calculating with the computing device a display ratio based on the pixel ratio measurement of the first display device and the pixel ratio measurement of the second display device, and rendering on the first display device an actual-size display of the second display device based on the display ratio.

While the system and method is described herein by way of example and embodiments, those skilled in the art will recognize that the method of rendering an actual-size emulation of a display of a mobile device on a display device is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Disclosed embodiments provide for rendering an actual-size emulation of the display of a mobile device on the display of another device. The user interface of a design application may include rendering an actual-size emulation of the display of a mobile device, thus enabling a user (e.g., a designer) to see the size the display would appear on the actual mobile device.

Figure 1:
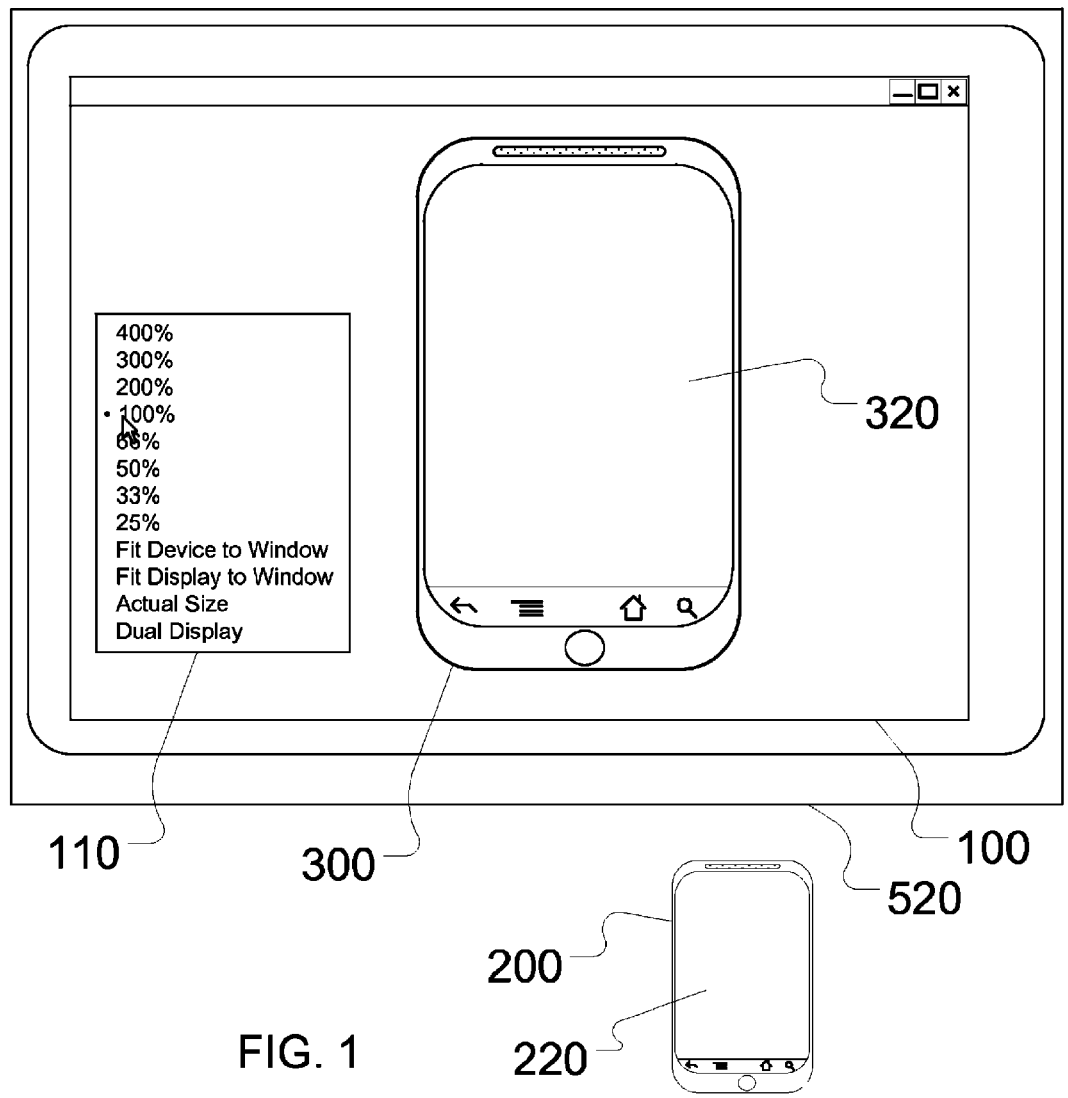
FIG. 1 illustrates an exemplary display of an emulated mobile device rendered on a display device.

Referring to FIG. 1, a processing device (e.g., processing device 511 shown in FIG. 5) renders a user interface ("UI") 100 of a design application on a display device 520. UI 100 renders an emulated mobile device 300. Thus, UI 100 allows a user to observe (i.e., preview) how software would appear on the display of a mobile device and interact with such software. While emulated mobile device 300 displays the entire structure of the mobile device in FIG. 1, embodiments may only emulate display 320 of mobile device 300. One of ordinary skill in the art understands that any time this disclosure refers to rendering emulated mobile device 300 and/or display 320, this display may or may not include a rendering of the entire mobile device 300.

FIG. 1 additionally illustrates an exemplary mobile device 200. The display 220 of mobile device 200 may have different dimensions than emulated display 320. Emulated display 320 may have an identical display resolution as display 220 of mobile device 200. Still, due to the differing pixel densities of display device 520 and display 220 of mobile device 200, display 320 may be rendered having different dimensions than display 220.

Mobile device 200 may be any device having a display 220. Mobile device 200 may, for example, be a smartphone, such as an APPLE® IPHONE®, GOOGLE® NEXUS ONE or other GOOGLE® ANDROID® based phone, or a BLACKBERRY® phone. Of course, mobile device 200 may also be a tablet, such as the APPLE® IPAD® or AMAZON® KINDLE®, a laptop, or any other device. Mobile device 200 has a display 220, for example an LCD or PDP display. Emulated mobile device 300 and emulated display 320 may likewise be an emulation of any mobile device, for example a smartphone, tablet, laptop, or other mobile device, having a display, for example a LCD or PDP display. Processing device 511 may be one or more processors in a computing device, for example a personal computer, a super computer, a tablet computer, a thin device, or any other computing device.

Embodiments of UI 100 may provide a display characteristic control 110 to allow a user to modify a display characteristic of emulated display 320. For example, display characteristic control 110 may be a drop-down menu configured to allow a user to select a size of emulated display 320. Of course, display characteristic control 110 is for illustrative purposes only and alternative menus may drop-down from a menu bar, or any other user interface control may be provided to allow a user to select a display characteristic. Additionally, the list of display characteristics provided in display characteristic control 110 is illustrative only of some exemplary display characteristics.

Figure 2:
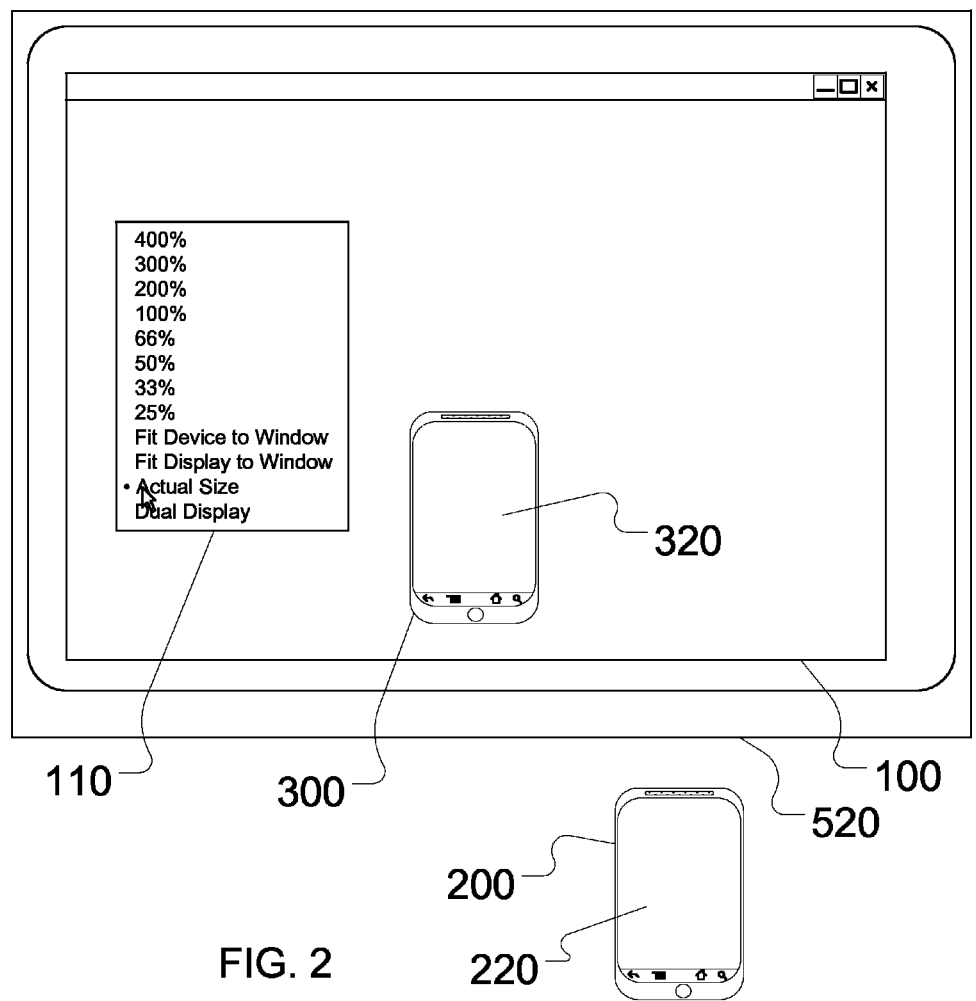
FIG. 2 illustrates an exemplary actual-size display of an emulated mobile device rendered on a display device.

Embodiments of UI 100 may allow a user to select to have emulated display 320 rendered the actual size of display 220. That may be accomplished based on a function of the pixel densities of both display 220 and display device 520. In such fashion, display 320 may appear rendered on display device 520 the identical size as display 220. For example, FIG. 2 shows UI 100 including emulated display 320 rendered at a display ratio based on the pixel density of display 220 and display device 520. Thus, a user may be provided with an actual-size preview, for example of software designed for mobile device 200.

Figure 3:
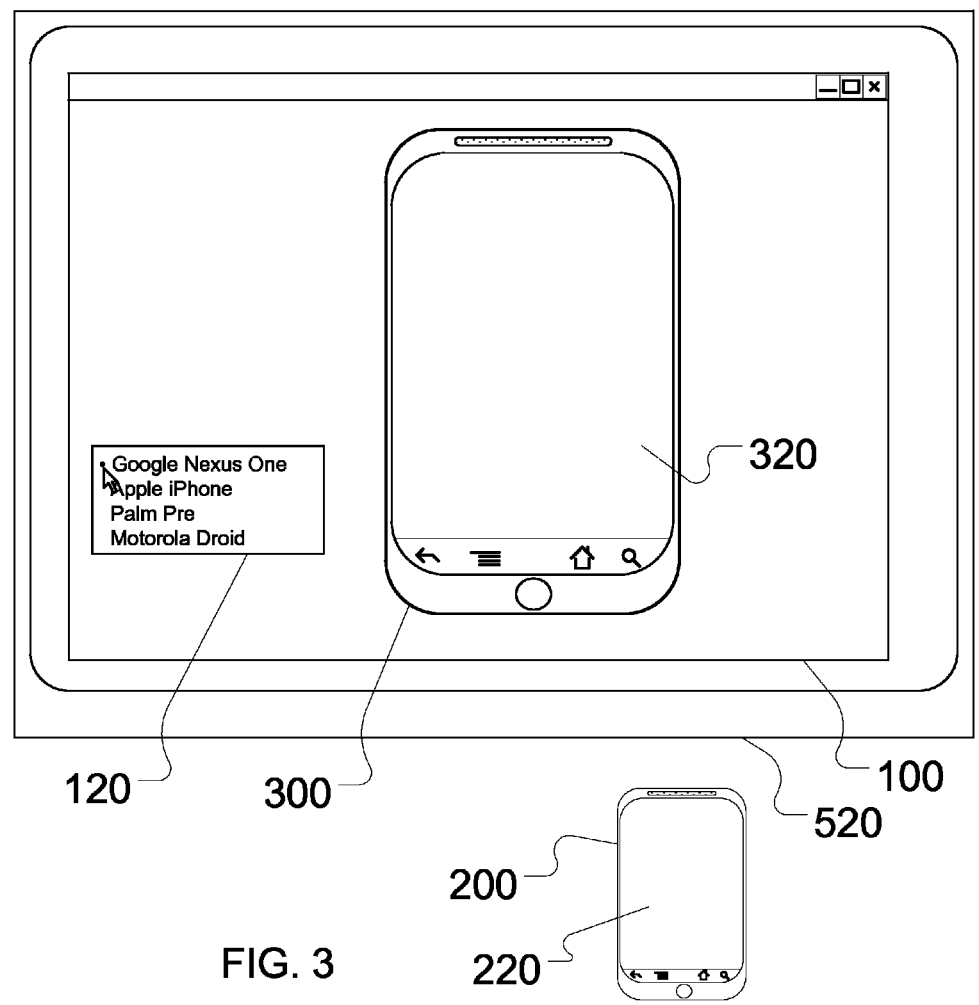
FIG. 3 illustrates an exemplary user interface configured to allow a user to select a mobile device to be emulated on a display device.

UI 100 may be configured to allow a user (e.g., a designer) of software for mobile devices) to select a mobile device 300 to have an emulated version rendered on display device 520. For example, FIG. 3 illustrates a menu 120 to allow a user to select a mobile device 300 to emulate. Of course, menu 120 is for illustrative purposes only and alternative menus may drop-down from a menu bar, or any other user interface control may be provided to allow a user to select a mobile device to render. Additionally, the list of smartphone mobile devices provided in FIG. 3 is illustrative only of some exemplary mobile devices. Alternative smartphones, tablets, or any other devices having a digital display may be emulated according to embodiments disclosed herein.

Figure 4:
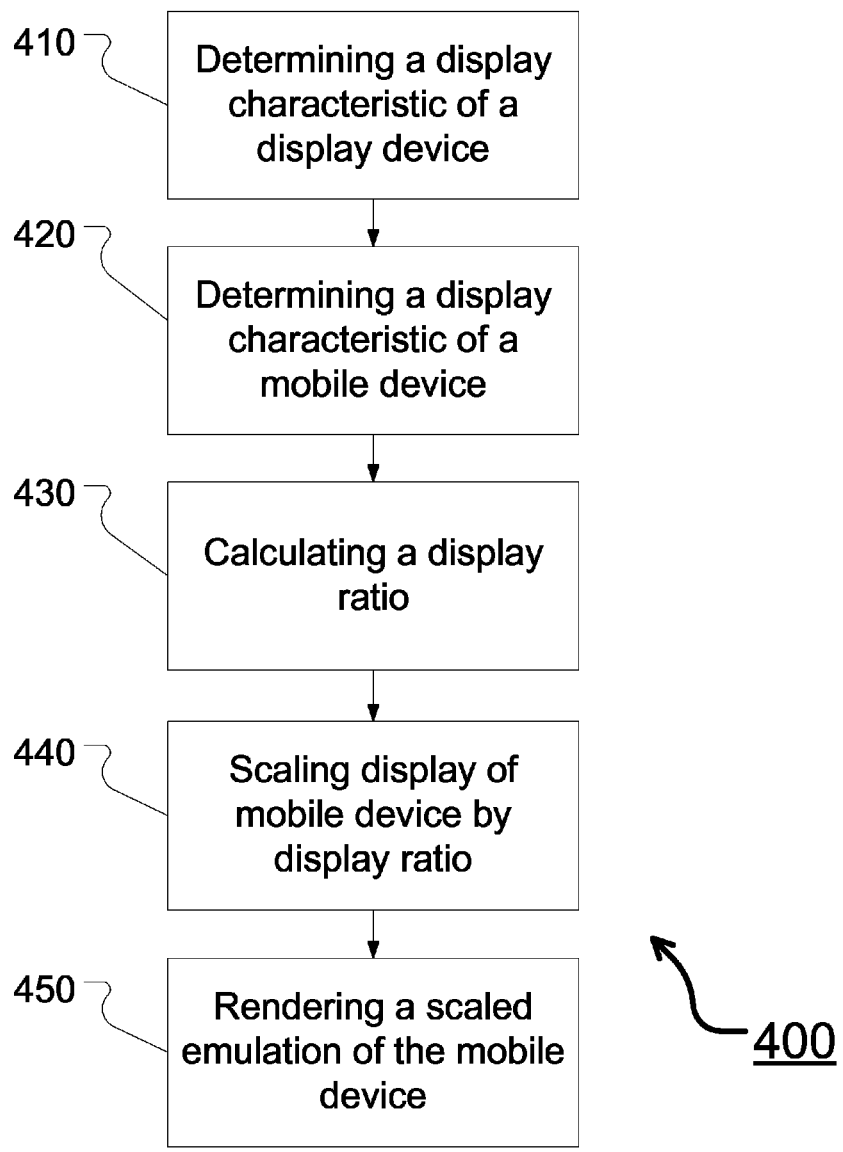
FIG. 4 illustrates an exemplary process flow for rendering an actual-size emulation of a display of a mobile device on a display device.

FIG. 4 illustrates an exemplary process flow 400 for rendering an actual-size emulation of a display of a mobile device on a display device. In step 410, a processing device determines a display characteristic of the display device on which the emulation will be rendered. For example, in the embodiment shown in FIG. 1, the processing device determines the pixel density of a display device (e.g., display device 520). The processing device may be configured or instructed to perform this step automatically, for example to automatically detect the pixel density of the display device operatively coupled to the processing device. Alternatively, UI 100 may prompt a user to provide a pixel density measurement of a display device. In still other embodiments, UI 100 may prompt a user to provide other characteristic information of a display device, for example the make and model or a serial number of the display device. The processing device may use this characteristic information to lookup a pixel density of the display device. The lookup may be performed, for example, by querying a database of pixel densities of display devices. Such a database may be local to the processing device (e.g., on a storage device operatively coupled to the processing device) or may be a remote database, for example accessed via a network, such as the internet.

Once the display characteristic of the display device is determined, the process flow proceeds to step 420. In step 420, the application determines a display characteristic of a mobile device. For example, UI 100 may prompt a user to select a mobile device to render or to provide display characteristic information about the mobile device (e.g., the manufacturer and model number of the display device in the mobile device or the PPI measurement of the display device). The processing device may use this characteristic information to lookup a pixel density of the display device. The lookup may be performed, for example, by querying a database of pixel densities of display devices. Such a database may be local to the processing device (e.g., on a storage device operatively coupled to the processing device) or may be a remote database, for example accessed via a network, such as the internet.

Of course, while FIG. 4 illustrates step 410 being performed before step 420, the temporal order of these steps only requires that both steps 410 and 420 be performed before step 430. For example, step 420 may be performed before step 410 or steps 410 and 420 may be performed in parallel.

After steps 410 and 420 are complete, the process proceeds to step 430. At step 430, a processing device calculates a display ratio. The display ratio is a function of the pixel density of the display device and the pixel density of the display of the mobile device to be emulated. To calculate the display ratio, the computing device divides the pixel density measurement of the display device by the pixel density measurement of the mobile device display. The display ratio may then be used to provide an actual-sized rendering of the mobile device display by scaling the display resolution of the emulated mobile device by the display ratio.

At step 440, the processing device scales the display of the emulated mobile device by the display ratio. In other words, the processing device multiplies the pixel size of the device by the display ratio.

Finally, at step 450, the processing device renders an actual-size emulation of the mobile device display on the display device.

By way of example, process flow 400 may allow a user of an APPLE® MAC PRO with a APPLE® 30" Cinema HD Display to render an actual-size emulation of the display of a GOOGLE® NEXUS ONE. A designer of software for the NEXUS ONE, for example, working on an APPLE® MAC PRO may wish to see how the software would appear on the actual-sized NEXUS ONE. In step 410, a processing device in the APPLE® MAC PRO may determine a characteristic of the APPLE® 30" Cinema HD Display operatively coupled thereto. For example, the processing device may automatically detect the pixel density of the APPLE® 30" Cinema HD Display. Alternatively, a user may enter the pixel density or may enter the display device model and the processing device may lookup the display device's pixel density. In step 410, thus, the processing device may determine that the pixel density of the APPLE® 30" Cinema HD Display is 101.65 PPI.

At step 420, the processing device determines a characteristic of the GOOGLE® NEXUS ONE. For example, a designer may select the NEXUS ONE from a plurality of optional mobile devices to be rendered provided through a user interface. The processing device may then determine the pixel density of the mobile device, for example by performing a lookup. For a NEXUS ONE, the processing device may determine that the pixel density is 252.15 PPI.

At step 430, the processing device calculates a display ratio of the display device and the display of the mobile device by dividing the pixel density of the display device by the pixel density of the mobile device. Thus, the processing device may determine that the display ratio of an APPLE® 30" Cinema HD Display to a NEXUS ONE is 101.65 PPI/252.15 PPI=0.40313306.

At step 440, the processing device scales the display resolution of the emulated mobile device by the display ratio. Thus, because a NEXUS ONE has a display resolution of (800×480), the display resolution of an emulated NEXUS ONE becomes (322×193). Of course, one of ordinary skill in the art understands that mobile devices are often configured to be used with different screen orientations (e.g., a mobile device may be turned to view in a portrait or landscape orientation) and, accordingly, the emulated mobile device may be rendered with any orientation.

At step 450, the scaled emulation of the mobile device is rendered on the display device. For example, an actual-size NEXUS ONE display may be rendered on an APPLE® 30" Cinema HD Display.

While process flow 400 illustrates many independent steps, any or all of the steps may be combined or divided in embodiments. For example, software for performing process flow 400 may include modules for each step, may include fewer modules with one or more modules performing a plurality of steps, or may include additional modules further breaking down the steps. Process 400 may also include additional steps to implement additional features of embodiments.

Figure 5:
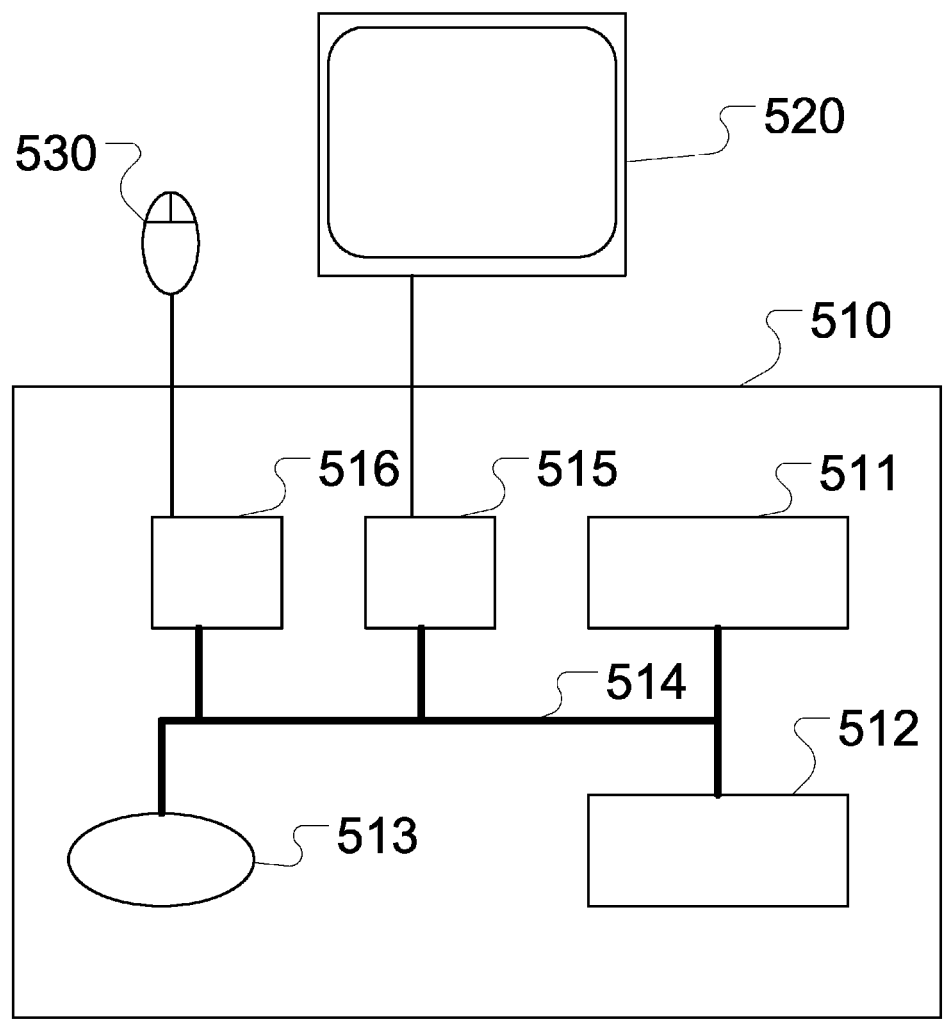
FIG. 5 illustrates an exemplary computing device for rendering an actual-size emulation of a display of a mobile device on a display device.

A method for rendering an actual-size emulation of the display of a mobile device on a display device may be implemented with software executed on computing device 510 of FIG. 5. Computing device 510 has one or more processing device 511 designed to process instructions, for example computer readable instructions stored on a storage device 513. By processing instructions, processing device 511 may render on a display device 520 an actual-size emulation of a mobile device display. Storage device 513 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 510 additionally has memory 512, an input controller 516, and an output controller 515. A bus 514 operatively couples components of computing device 510, including processing device 511, memory 512, storage device 513, input controller 516, output controller 515, and any other devices (e.g., network controllers, sound controllers, etc.). Output controller 515 is operatively coupled (e.g., via a wired or wireless connection) to a display device 520 (e.g., a monitor, television, mobile device screen, etc.) in such a fashion that processing device 511 and output controller 515 can transform the display on display device 520 (e.g., in response to modules executed). Input controller 516 is operatively coupled (e.g., via a wired or wireless connection) to one or more input device 530 (e.g., mouse, keyboard, touch-pad, scroll-ball, touch-display, etc.) in such a fashion that input can be received from a user (e.g., a user may select with input device 530 UI controls, for example mobile devices from menu 110 rendered on display device 520).

Of course, FIG. 5 illustrates computing device 510, display device 520, and input device 530 as separate devices for ease of identification only. Computing device 510, display device 520, and input device 530 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Further, while computing device 510 is illustrated as a single, discrete device, computing device 510 may be multiple computing devices coupled (e.g., networked) together, for example a cloud computing system or a clustered server.

Embodiments may include software for rendering an actual-size emulation of a mobile device display. For example, computer-readable instructions may be stored on non-transitory storage device 513. The computer-readable instructions may be configured to be processed by processing device 511 to determine a pixel density of a display device, determine a pixel density of a mobile display device, calculate a display ratio based on the pixel densities of both the display device and the mobile display device, scale a display resolution of the mobile display device according to the calculated display ratio, and render a scaled emulation of the display of the mobile device.

Figure 6:
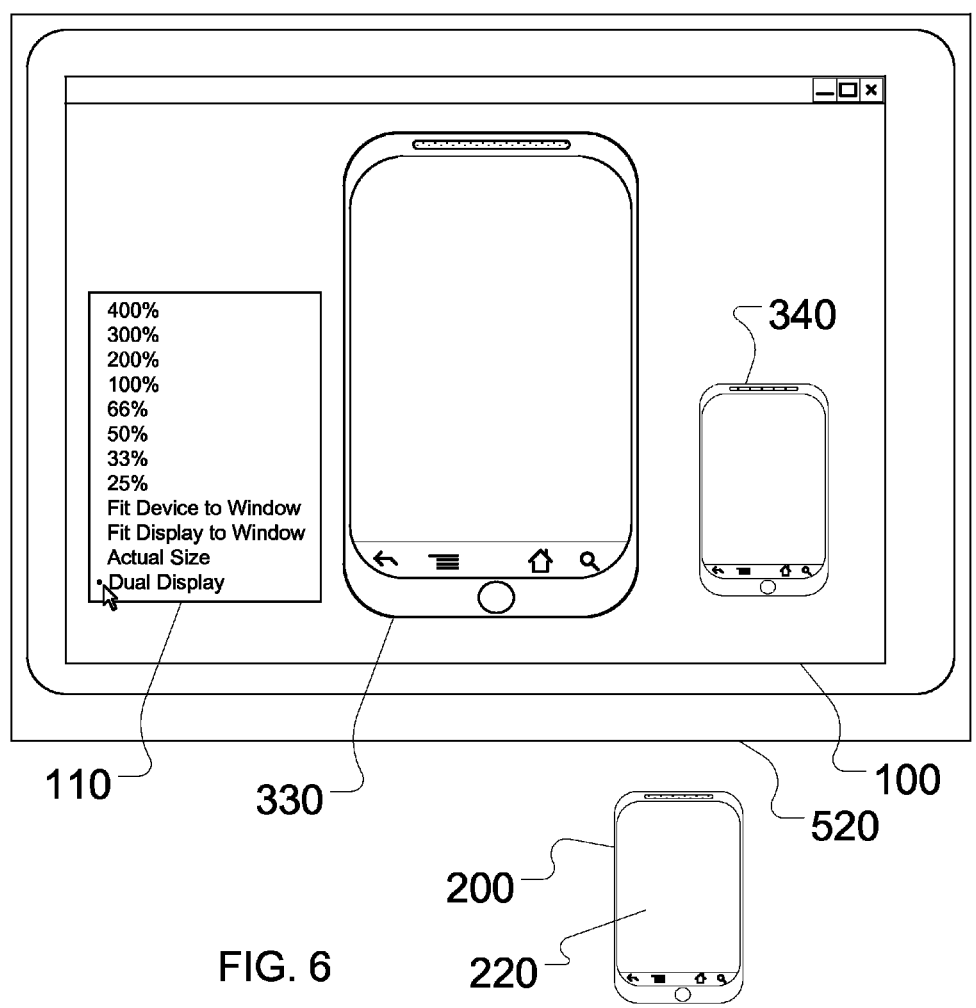
FIG. 6 illustrates an exemplary user interface configured to display one or more views of an emulation of a display of a mobile device on a display device.

While the above embodiments disclose rendering a single emulation of a mobile device display, alternative embodiments may render multiple emulations of a mobile device display. For example, FIG. 6 illustrates an embodiment having two views of an emulated mobile device. A first view 330 may be rendered with a first display characteristic, for example having an identical display resolution to a mobile device 200 display 220. A second view 340 may also be rendered, the second view having a second display characteristic, for example second view 340 may be an actual-size emulation. Further, first view 330 and second view 340 may be views of the same emulated mobile device display, thus allowing a user to observe a greater detail in first view 330 while simultaneously allowing a user to observe how software would appear on an actual mobile device display in second view 340. Of course, more than two views may be shown, each having different display characteristics of the display device.

Still other embodiments may simultaneously render emulations of multiple different mobile display devices. For example, a designer designing cross-platform software may wish to see an actual-size preview of how the software would appear on both an APPLE® IPAD® and a GOOGLE® NEXUS ONE. Embodiments of the method and system disclosed herein, thus, may render actual-size emulations of the displays of each device with each device running the designer's cross-platform software.

Still other embodiments may allow a user of a mobile device to render a view of their mobile device on another display device. For example, a user of a NEXUS ONE wishing to type an email may wish to render an actual-size view of the NEXUS ONE on their PC and interact with the NEXUS ONE through their PC keyboard to type the email. In such an embodiment, the NEXUS ONE may be operatively coupled to the PC, for example via a cable (e.g., a USB cable), bluetooth connection, or any other communication interface. Thus, the PC may detect the pixel density of its display device, detect the pixel density of the mobile device display, calculate a display ratio based on the detected pixel densities, scale the display resolution of the mobile device, and render a scaled display of the mobile device display on the PC's display device.

Embodiments disclosed herein refer to "actual-size emulation", "actual-size preview", "actual physical size" and other similar descriptions of rendered mobile device displays. One of ordinary skill in the art understands that the dimensions of the mobile device display rendered on another display device has substantially identical dimensions as the display of an actual mobile device of the same model. Thus, a user of the embodiments disclosed herein may hold a mobile device up to an emulated mobile device display and observe that the dimensions of the emulated mobile device display is substantially the same size as that of the actual mobile device.

Additionally, while the displays of the mobile devices illustrated in the drawings appear blank, one of ordinary skill understands that embodiments disclosed herein render the displays of emulated mobile device display on other display devices. For example, if a designer is designing a webpage for display on a mobile device, the designer may emulate a specific mobile device to see an actual-size preview of how that webpage would appear on that specific mobile device display. Thus, the rendered emulation of the mobile device display may show the webpage substantially the exact same size at it would appear on that specific mobile device. Additionally, a user may interact with the rendered emulation of the mobile device via an input device operatively coupled to the processing device rendering the emulated mobile device display. Thus, if the emulated mobile device is a touch-display mobile device, a user may interact with the rendered emulation of the mobile device display by clicking with a mouse on the rendered display.

Of course, while embodiments disclosed herein generally provide for displaying an actual-size emulation of a mobile device display on a larger display device, the systems and methods disclosed herein may be implemented using any two display devices. For example, a designer on a newer display device may wish to render an emulation of an older display device to observe how it may appear to others. Further, a user of a mobile device, for example a tablet or smartphone, may render an actual-size emulation of a larger display device. In such an instance, only a portion of the emulated larger display device may be rendered on the mobile device and the mobile device user may scroll in the X and Y directions to view the entire emulated display.

The invention has been described through embodiments. However, various modifications can be made without departing from the scope of the invention as defined by the appended claims and legal equivalents.

The invention claimed is:

1. A computer-implemented method, comprising:
    determining with a computing device a first pixel density of a first display device;
    determining with said computing device a second pixel density of a second display device;
    determining with said computing device a display resolution of the second display device;
    calculating with said computing device a display ratio based at least in part on said first pixel density and said second pixel density;
    calculating with said computing device an emulation display resolution based at least in part on the display resolution and the display ratio; and
    rendering with said computing device on said first display device a scaled display of said second display device based at least in part on the emulation display resolution.

2. The method of claim 1, wherein said first display device corresponds to an application development system developing an application and said second display device corresponds to a mobile device on which the application will run.

3. The method of claim 1, wherein said scaled display shows an actual size of said second display device.

4. The method of claim 3,
    wherein calculating the display ratio comprises:
        dividing the first pixel density by the second pixel density; and
    wherein the actual size of the second display device is the display resolution of the second display device multiplied by the display ratio.

5. The method of claim 1, wherein determining the second pixel density and determining the display resolution comprises:
    receiving input through a user interface of said computing device, the received input specifying at least one of:
        a make of the second display device;
        a model of the second display device; or
        a serial number of the second display device; and
    querying a database based on the received input to determine the second pixel density and the display resolution of the second display device.

6. The method of claim 1, wherein said first display device is operatively coupled to said computing device, and
    wherein determining the first pixel density comprises:
        detecting with said computing device the first pixel density of the first display device.

7. The method of claim 1, wherein said second display device is a touch-screen device, and wherein input through a user interface of said computing device interacts with an emulated user interface of said touch-screen device.

8. The method of claim 1, wherein said second display device is a touch-screen device, and wherein input through a user interface of said computing device interacts with a user interface of said touch-screen device.

9. The method of claim 1, further comprising rendering on said first display device a second scaled display of said second display device based at least in part on said emulation display resolution, wherein the second scaled display has a different scale than the first scaled display.

10. The method of claim 9, wherein the first scaled display shows an actual size of said second display device and the second scaled display shows the second display device in greater detail than the first scaled display.

11. The method of claim 1, wherein the first display device and the computing device is a same device.

12. The method of claim 1, further comprising:
determining a third pixel density of a third display device to be emulated on the first display device;
calculating a second display ratio based at least in part on the first pixel density and the third pixel density;
rendering on the first display device a second scaled display of the third display device based at least in part on the second display ratio.

13. The method of claim 12,
wherein the first display ratio is different than the second display ratio;
wherein the first scaled display of the second display device shows an actual size of the second display device; and
wherein the second scaled display of the third display device shows an actual size of the third display device.

14. A computing device, comprising:
a first display device; and
a processor for executing instructions to provide a graphical user interface displayed on said first display device, the user interface comprising:
a scaled display of a second display device;
wherein said scaled display of said second display device is rendered based at least in part on an emulation display resolution, wherein the emulation display resolution is based at least in part on a display resolution of the second display device and a display ratio, the display ratio based at least in part on a first pixel density of the first display device and a second pixel density of the second display device.

15. The computing device of claim 14, wherein said scaled display shows an actual size of said second display device.

16. The computing device of claim 14, wherein said display resolution and second pixel density are determined with said computing device by receiving input through said user interface of said computing device, the received input specifying the display resolution and the second pixel density of the second display device.

17. The computing device of claim 14, wherein said first display device is operatively coupled to said computing device, and
wherein said emulation display resolution is determined with said computing device by detecting with said computing device the first pixel density and receiving input indicating the display resolution and the second pixel density of the second display device.

18. The computer device of claim 14, wherein said first display device corresponds to an application development system developing an application and said second display device corresponds to a mobile device on which the application will run.

19. A computer-implemented method comprising:
determining with a computing device a first pixel density of a first display device;
determining with said computing device a second pixel density of a second display device;
determining with said computing device a display resolution of the second display device,
wherein said computing device has stored in a non-transitory memory pixel densities and display resolutions of a plurality of potential display devices, the plurality of potential display devices including the second display device,
wherein determining the second pixel density and the display resolution of the second display device comprises retrieving the second pixel density and the display resolution of the second display device from the non-transitory memory;
calculating with said computing device a display ratio based at least in part on said first pixel density and said second pixel density;
calculating with said computing device an emulation display resolution based at least in part on the display resolution and the display ratio; and
rendering on said first display device a scaled display of said second display device based at least in part on the emulation display resolution.

20. The method of claim 19, wherein where said first display corresponds to an application development, system developing an application and said second display devices correspond to one or more mobile device on which the application will run.

21. A non-transitory computer-readable medium comprising program code for:
determining a first pixel density of a first display device;
determining a second pixel density of a second display device;
determining a display resolution of the second display device;
calculating a display ratio based at least in part on said first pixel density and said second pixel density;
calculating an emulation display resolution based at least in part on the display resolution and the display ratio; and
rendering on said first display device a scaled display of said second display device based at least in part on the emulation display resolution.

22. The non-transitory computer-readable medium of claim 21, wherein where said first display corresponds to an application development system developing an application and said second display devices correspond to one or more mobile device on which the application will run.

* * * * *

UNITED STATES PATENT AND TRADEMARK OFFICE
CERTIFICATE OF CORRECTION

PATENT NO. : 8,531,487 B2  Page 1 of 1
APPLICATION NO. : 12/862341
DATED : September 10, 2013
INVENTOR(S) : Mathew Snow It is certified that error appears in the above-identified patent and that said Letters Patent is hereby corrected as shown below:

In the claims

Column 10, line 27, After "wherein", please delete "where".

Column 10, line 28, After "application development", please delete ",".

Column 10, line 28, After "system", please insert -- for --.

Column 10, line 48, After "wherein", please delete "where".

Column 10, line 49, After "system", please insert -- for --.

Signed and Sealed this
Tenth Day of December, 2013

Margaret A. Focarino
*Commissioner for Patents of the United States Patent and Trademark Office*